United States Patent [19]

Haugen et al.

[11] Patent Number: 4,523,674
[45] Date of Patent: Jun. 18, 1985

[54] IMPACT ROLLER STRUCTURE

[75] Inventors: Gary Haugen; Everett Amundson, both of Minot, N. Dak.

[73] Assignee: Impact Roller, Inc., Minot, N. Dak.

[21] Appl. No.: 389,161

[22] Filed: Jun. 17, 1982

[51] Int. Cl.³ .............................................. B65G 39/06
[52] U.S. Cl. ...................................... 198/843; 193/37
[58] Field of Search ............... 198/843, 842, 780, 824; 193/37; 29/132, 110

[56] References Cited

U.S. PATENT DOCUMENTS

| | | | |
|---|---|---|---|
| 2,007,910 | 7/1935 | Stephens | 198/843 |
| 2,052,900 | 9/1936 | Searles et al. | 198/843 |
| 2,169,625 | 8/1939 | Weiss et al. | 198/843 |
| 2,622,447 | 12/1952 | Murphy | 198/843 |
| 2,632,560 | 3/1953 | Wright | 198/843 |
| 2,828,640 | 4/1958 | Stracken | 198/843 |
| 2,925,168 | 2/1960 | Lorig | 198/843 |
| 3,029,655 | 4/1962 | Morrow | 198/843 |
| 3,211,278 | 10/1965 | Arndt | 198/843 |
| 3,310,160 | 3/1967 | Reilly | 198/843 |
| 3,923,150 | 12/1975 | Jager | 198/780 |
| 4,425,694 | 1/1984 | Somerville | 29/110 |

FOREIGN PATENT DOCUMENTS

| | | | |
|---|---|---|---|
| 762571 | 11/1956 | United Kingdom | 198/843 |
| 383659 | 9/1973 | U.S.S.R. | 198/843 |
| 388398 | 10/1973 | U.S.S.R. | 198/843 |

Primary Examiner—Joseph E. Valenza
Assistant Examiner—Daniel R. Alexander
Attorney, Agent, or Firm—Merchant, Gould, Smith, Edell, Welter & Schmidt

[57] ABSTRACT

An impact roller structure (10) for absorbing impact imparted on a conveying surface. The impact roller structure (10) includes a hub portion (11) having an opening (12) therein. The impact roller structure (10) further includes an outer ring-like portion (15) for making contact with the conveying surface. The ring-like portion (15) and the hub portion (11) are interconnected by a plurality of radially extending members (17). The radially extending members (17) define a plurality of hollow cylinders (18) between the hub portion (11) and the outer ring-like portion (15). The radially extending members (17) are constructed and arranged for cooperating with the hub portion (11) and the ring-like portion (15) so as to efficiently absorb shock imparted on the impact roller structure (10).

23 Claims, 12 Drawing Figures

FIG. I
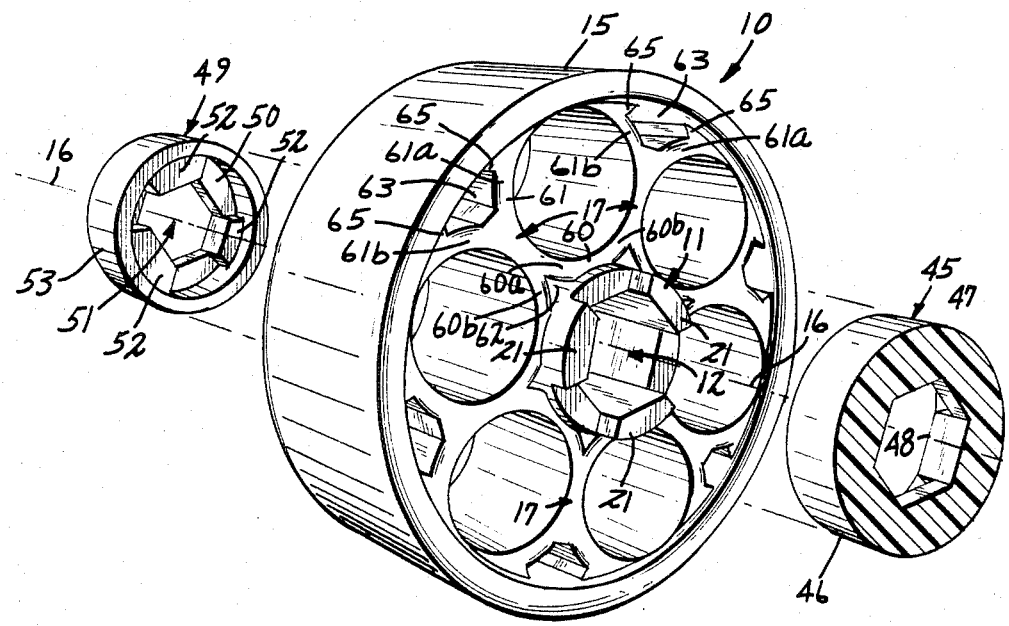
FIG. II
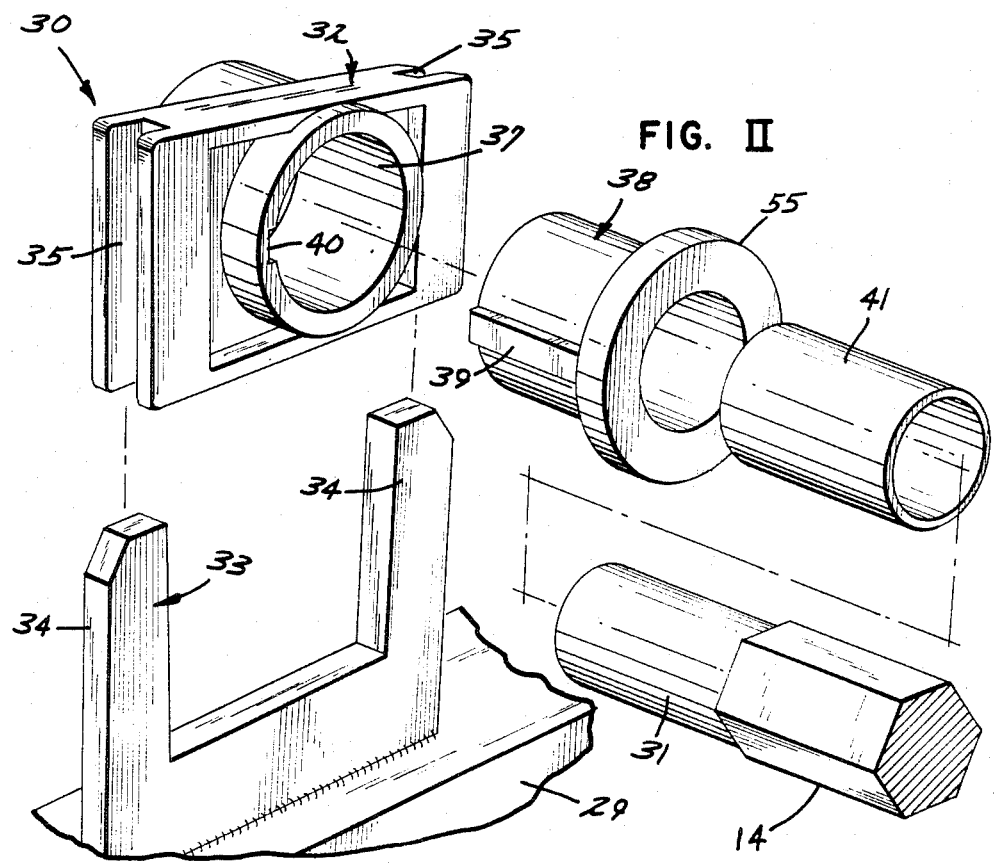

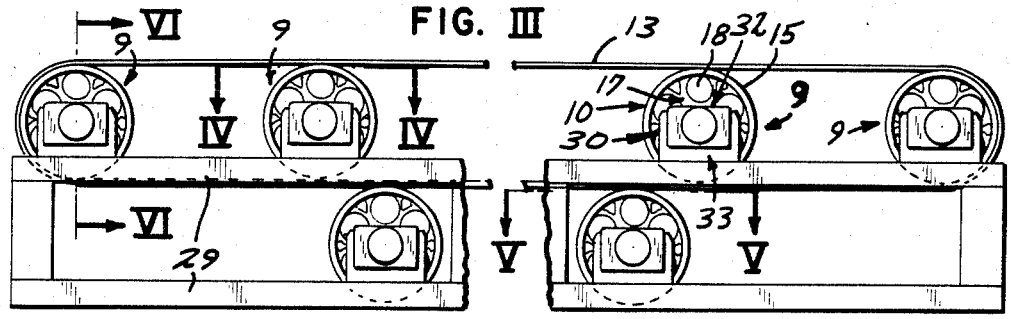
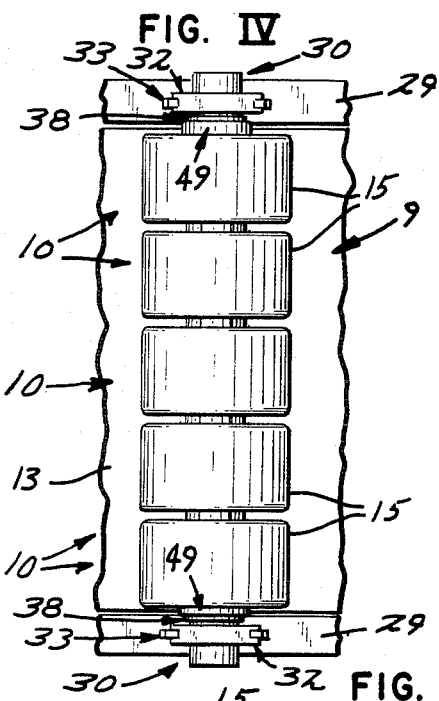
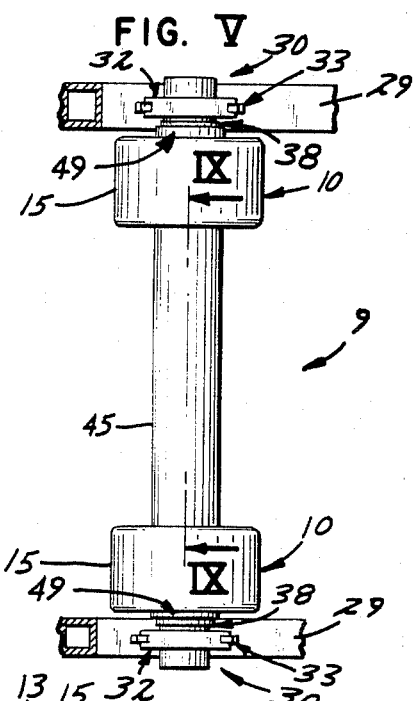
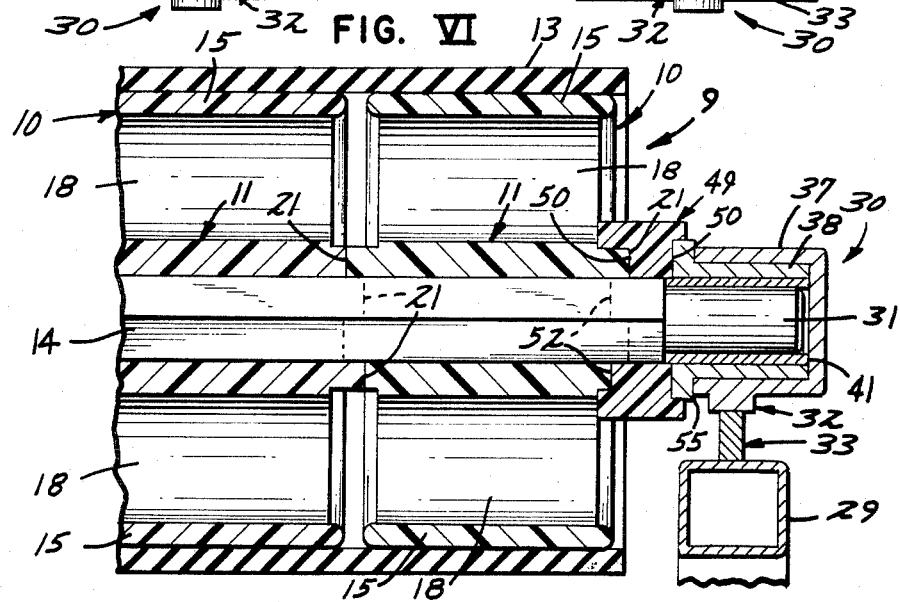

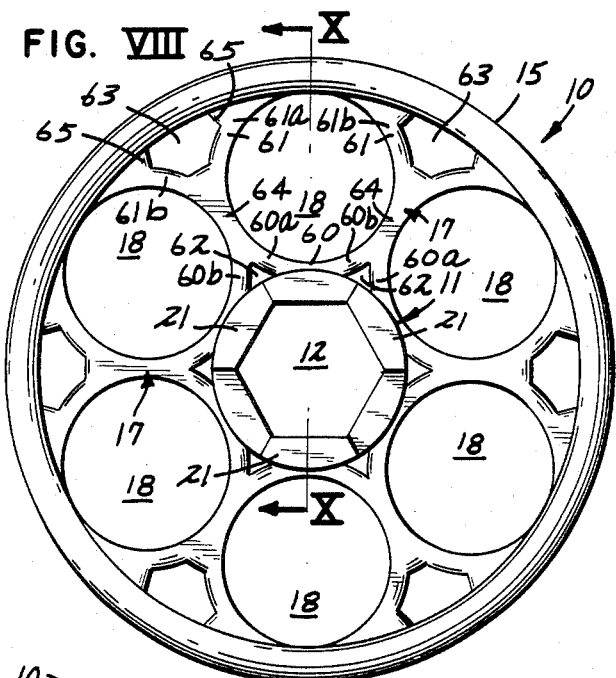
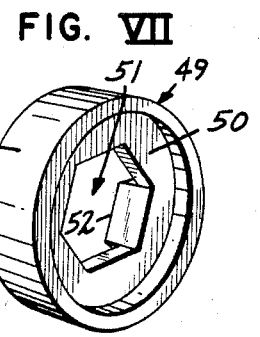
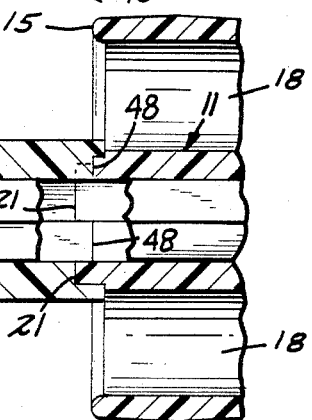
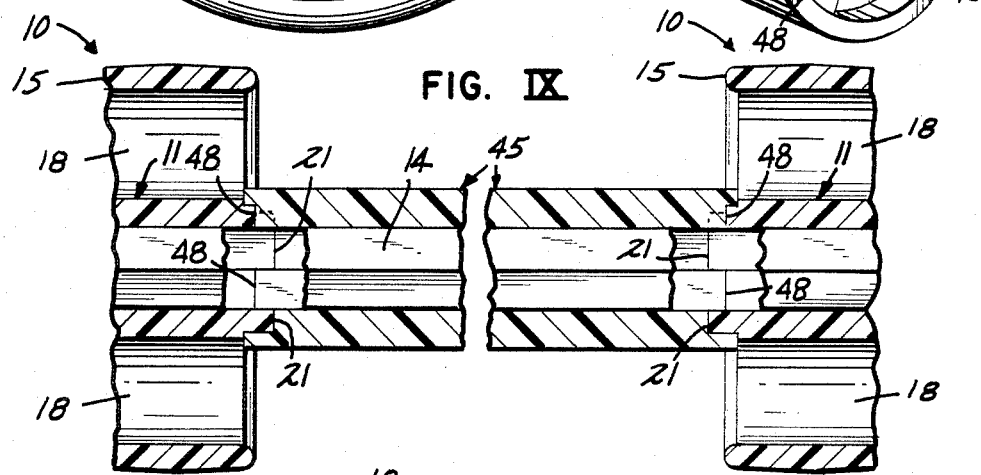
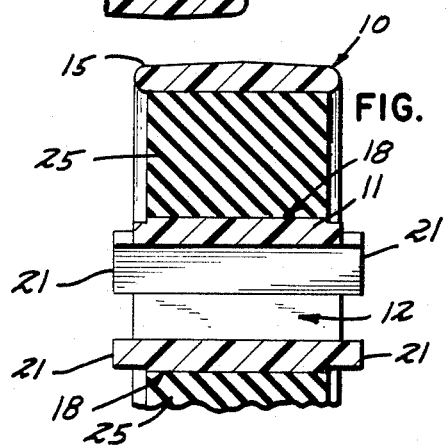
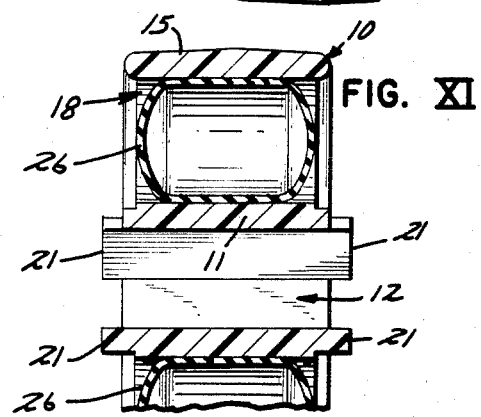

IMPACT ROLLER STRUCTURE

TECHNICAL FIELD

The present invention relates to an impact roller structure which is adapted to support an endless conveyor belt. More particularly, the present invention relates to an impact roller structure constructed and arranged to have improved impact absorption characteristics.

BACKGROUND OF THE INVENTION

In endless belt conveyor installations, the usual practice is to have loading stations at definite locations for deposition of the material to be conveyed. The belts extend in many cases several hundred feet. Because of their length and construction, they are extremely expensive. The nature and structure of these belts often render them susceptible to damage by the materials they convey. This damage often occurs at the loading station of the belt conveyor where the materials strike the belt with considerable impact and where there is not sufficient means to cushion the shock.

To protect the belt against such damage, impact absorbing idler assemblies having impact roller structures are usually placed along the conveyor at places of high impact or shock loads. In some instances the idler assemblies may extend the entire length of the conveyor.

Generally, the impact idler assemblies are made as light as possible. However, the impact idler assemblies which support the belt in the region of the loading stations are subjected to considerably heavier abuse than those assemblies which merely support the load as it is being carried along by the belt.

Early in the art, the roller portions of the impact idler assemblies were composed of a deformable material such as rubber which was frequently wrapped around a steel roller shell so as to provide additional absorption characteristics. However, such impact roller structures were found to not afford enough cushioning to do an adequate job of impact absorption due to a lack of provision for the rubber to flow or deform. The individual impact roller structures in the impact idler assemblies were found to become permanently deformed under the impact of material which was deposited onto the belt. Permanent deformation of the impact roller assemblies is undesirable because it displaces the center of gravity of the roller assemblies away from the roller axis. Consequently, the roller wobbles. As the roller wobbles, it takes on the characteristics of an eccentric. The bearings, therefore, wear at a much faster than normal rate, thus shortening the life of the bearings and other roller components.

Wobbly rotation of the rollers also tends to increase the power requirement because of the eccentric characteristics of the roller. Roller wobble may also result in a variation in the magnitude of the frictional force between the belts and the roller, and thereby variations in the driving force between the belt and the roller assemblies. Further, impact rollers whose masses are displaced from free rotation also tend to wear at a more rapid rate due to the generation of internal heat and friction. Various prior attempts to overcome these undesirable effects have been made.

As the art advanced, slots or grooves were formed in a thick rubber ring to permit substantial deflection, and having energy absorbing capacity many times that of the first, smooth rubber covered rollers. The diameters were enlarged and the width of the area between the grooves was narrowed to provide a maximum degree of impact absorption. But, to provide a full range of impact rollers, a great many sizes have to be stocked.

To solve this problem, a series of tire-like elements or segments made of yieldable elastomer have been mounted on a rotatable shaft in a sufficient quantity to equal the widths required. This design, however, presents a difficulty in mounting the segments to the shaft. Often, one or more of these segments will loosen, and friction caused by slippage will soon destroy the segment and present a serious danger to the belt.

To allow greater deformation and therefore greater impact absorption by the idler, tire-like segments were narrowed at the circumference to small tapering tips. This leaves a large proportion of the belt unsupported by the idler and imposes excess shear loads on the belt carcass.

The present invention with its many advantageous features solves many of these problems.

SUMMARY OF THE INVENTION

The present invention relates to an impact roller structure for absorbing impact imparted on a conveying surface. The impact roller structure includes a hub portion having an opening therein. The impact roller structure further includes an outer ring-like portion for making contact with the the conveying surface. The ring-like portion and the hub portion are interconnected by a plurality of radially extending members. The radially extending members define a plurality of hollow cylinders between the hub portion and the outer ring-like portion. The radially extending members are constructed and arranged for cooperating with the hub portion and the ring-like portion so as to efficiently absorb and transmit shock imparted on the impact roller structure.

The present invention is particularly advantageous because it displays a maximum cushioning effect to thereby minimize the detrimental effects of impact on the conveyor belt and on the impact roller structure itself. The novel roller structure is constructed and arranged to redistribute and channel the shock forces due to impact.

Another feature of the present invention may include filling the cylindrical openings with impact load absorbing materials or air tubes or the like for additional shock loading and impact absorption characteristics.

A further feature of the present invention is that it can be assembled as a unitary one-piece roller structure molded of an elastomeric material thereby lowering manufacturing costs and allowing the rollers to be mass produced. This speeds up the manufacturing process.

Another advantage of the present invention is its ability to facilitate roller stacking so as to encompass any desired length of shaft requirement. This is accomplished by using a plurality of interlocking spline members extending axially from the hub portion of said impact roller structure to an adjacent impact roller structure. The interconnecting spline members cooperate with each other to form an integrated idler assembly so as to prevent the relative movement of adjacent rollers with respect to each other.

Additionally, spacer members may be inserted on the shaft between adjacent impact roller structures so as to facilitate various widths and combinations of impact rollers on shafts of varying lengths. Spacer members have axially extending members which are similar to those of the impact roller structure. The axially extending members interconnect and cooperate with the axially extending members from the hub portion of the impact roller structure to form an integrated structure.

In yet another feature of the present invention, cylindrical seals can be utilized to cooperate with the axially extending spline members of the impact roller to form a revolving seal between the impact roller and bearing structure to throw off any particulate material that may come into contact with the seal. This minimizes the wear of the roller structure and bearing structure due to the abrasive action of the particulate material and thus extends the useful life of the roller, keeping maintenance costs down.

Still another advantageous feature of the present invention is the utilization of a hexagonal shaft having a relatively large shaft size thereby preventing any slippage on the shaft by the impact roller structure and enabling the shaft to withstand the various forces exerted by impact on the roller structures.

Yet another feature of the present invention is its use of a bearing structure which includes a molded portion or pillow block member suitably attached to the frame of a conveyor belt by a mounting yoke. The pillow block is secured to the mounting yoke by a tongue and groove arrangement which allows the pillow block to be easily removed for repair or replacement.

The bearing structure has a cylindrical bushing with a ring-like portion at one end thereof for association with one end of the cylindrical seal. This minimizes the amount of dirt and gravel which works its way into the roller and bearing structure. The hexagonal shaft may be milled to be received in a bearing sleeve which is positioned in the cylindrical bushing of the bearing support structure thereby resisting abrasion and providing for less wear on the shaft and the bearing structure.

As a result of its modular construction and relatively few working parts, the present invention facilitates ease of repair and reduces the cost of repair. In addition, maintenance is reduced as the impact roller structure and its associated elements have an extended useful life.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views, FIG. I is an exploded view in perspective of an impact roller structure and associated seal and spacer;

FIG. II is an exploded view in perspective of the elements comprising the bearing structure;

FIG. III is a side elevational view of a conveyor belt assembly;

FIG. IV is a fragmentary plan view along lines IV—IV of FIG. III;

FIG. V is a fragmentary plan view along lines V—V of FIG. III;

FIG. VI is a fragmentary view in vertical section along lines VI—VI of FIG. III;

FIG. VII is an opposite side view in perspective of the seal in FIG. I;

FIG. VIII is an end elevational view of an impact roller structure;

FIG. IX is a sectional view along lines IX—IX of FIG. V;

FIG. X is a sectional view along lines X—X of FIG. VIII illustrating the hollow cylinders filled with a shock absorbing material;

FIG. XI is a sectional view along lines X—X of FIG. VIII illustrating the hollow cylinders having a sealed liner therein; and FIG. XII is an opposite side view in perspective of the spacer in FIG. I.

DETAILED DESCRIPTION OF THE INVENTION

Referring now to the drawings, a preferred embodiment of an impact roller structure 10 of the present invention is perspectively illustrated in FIG. I. Impact roller structure 10 is constructed and arranged as a unitary one piece impact roller to be utilized either singularly or in conjunction with other rollers in an impact idler assembly 9 for absorbing impact imparted on a conveying surface such as a conveyor belt 13 as shown in FIG. III. Impact roller structure 10 as an integrated one piece roller structure may be uniformly molded or constructed from an elastomeric material such as polyurethane. A 93A durometer urethane will provide the desired resilient characteristics for certain applications. The durometer rating will vary depending on the application. However, for most applications a durometer range from 80A to 70D will provide the desired characteristics.

As illustrated in FIGS. I and VIII, impact roller structure 10 includes an inner hub portion 11 having an opening 12 in the center thereof for reception of a shaft 14 so as to be rotatable with shaft 14 about an axis 16 which is substantially parallel to shaft 14. Impact roller structure 10 further includes an outer annular rim or ring-like portion 15 about the circumference thereof for making contact with a bottom surface of conveyor belt 13. Ring-like portion 15 has an outer surface of sufficient axial dimensions so as to provide an adequate support surface for conveyor belt 13. Note that impact roller structure 10 may be constructed in varying sizes such that ring-like portion 15 has varying axial dimensions approximating that of impact roller structure 10. In certain applications a ring-like portion 15 having an axial dimension of four inches may be effective and to provide desired support. Of course, the dimension may vary depending on the application.

Ring-like portion 15 is interconnected with hub portion 11 thereby forming an integrated unitary structure. A plurality of generally radially extending members 17 interconnect outer ring-like portion 15 with hub portion 11. Radially extending members 17 are constructed and arranged so as to define a plurality of hollow cylinders 18 positioned between hub portion 11 and outer ring-like portion 15. Members 17 cooperate with hub portion 11 and ring-like portion 15 so as to absorb the shock imparted to the impact roller structure 10. Members 17 are constructed and arranged to spread and redistribute the shock force due to impact about roller structure 10.

Referring now more particularly to FIGS. I and VIII, aperture 12 of hub portion 11 is shown extending through the axial dimension of impact roller structure 10. Aperture 12 is further shown as having six sides in a hexagonal arrangement constructed for reception of a hexagonal shaft 14, a fragmentary view of which is illustrated in FIG. II. In addition, a plurality of axially extending members 21 are shown extending from hub portion 11 on both ends of hub portion 11. In FIG. I, three members 21 are shown extending axially from the sides of hub portion 11. Members 21 are staggered so as to extend from every other side of aperture 12. Thus, members 21 are equally spaced circumferentially from one another. Members 21 are rectangular in nature. The axially extending members or splines 21 serve as positive clutch teeth adapted to engage complimentary teeth on an adjacent impact roller structure 10 or a seal 49 or a spacer 45. Thus the axially extending members prevent any relative slippage of parts and provide an overall integrated idler assembly.

Axially extending members 21 on adjacent impact roller structures 10 thereby telescopically interlock with each other and cooperate with each other to prevent slippage of adjacent impact roller structures 10 relative to each other. The interlocking relationship between members 21 provides a unitary idler assembly 9. This prevents excessive wear on the hexagonal shaft 14 and hub portion 11 of impact roller structure 10. In addition, excessive wear on conveyor belt 13 due to the shearing effect of individual impact roller structures 10 slipping relative to one another is avoided.

The spacing between adjacent impact roller structure 10 should not be so great as to allow sagging of conveyor belt 13 to occur between adjacent impact roller structures 10. On the other hand, as illustrated in FIG. IV, some minimal spacing should be maintained between adjacent impact roller structures 10 to avoid excessive wear and abrasion between adjacent impact roller structures 10. In certain applications, a one half inch spacing between adjacent roller structures 10 each having an axial dimension of four inches, may be desirable. This will occur if the hub portion 11 extends axially approximately one quarter of an inch beyond the axial dimension of ring-like portion 15. It should be noted that the desired spacing and dimensions will vary depending on the specific application.

Radially extending members 17 are shown in FIGS. I and VIII as integral with hub portion 11 and ring-like portion 15 so as to form a unitary impact roller structure 10. Each radially extending member 17, in addition to having a radial extent, also extends axially substantially the axial dimension of impact roller structure 10. This provides additional structural integrity and shock absorbing characteristics.

Radially extending members 17 each are a substantially double concave wall structure. Radially extending members 17 have an inner base portion 60 integral with and adjacent to hub portion 11 and an outer portion 61 integral with and adjacent to ring-like portion 15. Inner portion 60 and outer portion 61 are integral with and interconnected via a middle portion 64. Each radially extending member 17 forks or splits apart at base portion 60 into two members 60a, 60b prior to interconnecting with hub portion 11. Members 60a, 60b and hub portion 11 thusly define an opening or hollow-wall member 62. Opening 62 has a substantially triangular shape with its sides being convex in nature. Opening 62 extends axially substantially the axial dimension of impact roller structure 10. Base portion 60, because of its above-described structure, is inherently adapted to permit slight deformation upon impact of an external load, uniformly spreading the shock. However, because of the structure and resiliency of base portion 60, it will return to its initial shape upon removal of the load.

Each radially extending member 17 divides or separates into two members 61a, 61b outer portion 61 prior to interconnecting with ring-like portion 15. Members 61a, 61b and ring-like portion 15 thus define an opening or hollow-walled member 63. Opening 63 has a substantially wedge shape with six sides. Two sides of opening 63 formed by members 61a, 61b are substantially convex in nature with a third side formed by ring-like portion 15 being concave in nature. Opening 63 extends axially substantially the axial dimension of impact roller structure 10. Outer portion 61, because of its structure, is inherently adapted to permit slight deformation upon impact of an external load, thereby uniformly distributing the shock. However, because of its structure and resilient nature, outer portion 61 will return to its initial shape upon removal of the external load.

Note that at the intersection of members 61a, 61b and 60a, 60b with themselves and other portions of impact roller structure 10, integral fillets 65 or concave moldings are utilized to fill in the sharp corners formed. For example, members 61a, 61b are radiused toward ring-like portion 15 to form the integral fillets 65 between members 61a, 61b and outer ring-like portion 15. Fillets 65 are important in increasing the overall strength of impact roller structure 10. Fillets 65 are constructed and arranged to reduce the acuteness of the angles formed at the various intersections. This reduces the likelihood of fracture at those intersections due to shock forces, thereby increasing the useful life of impact roller structure 10.

Adjacent radially extending members 17 are interconnected at inner base portion 60 by hub portion 11 of impact roller structure 10 and at peripheral portion 61 by ring-like portion 15. A pair of adjacent radially extending members 17 thus defines or forms a substantial portion of wall structure defining one hollow cylinder 18 having an axis parallel to that of impact roller structure 10 and being positioned between hub portion 11 and ring-like portion 15. In a preferred embodiment, there may be six hollow cylinder structures 18 having substantially parallel axes and being disposed axially about impact roller structure 10. The exact number of hollow cylinders 18 disposed axially about impact roller structure 10 may vary. Each radially extending member 17 in addition serves as a portion of the wall structure defining two adjacent hollow cylinders 18.

Radially extending members 17 are generally of uniform thickness about a major portion of the circumferential extent of hollow cylinders 18 so as to define hollow cylinders 18 having a wall structure of generally uniform thickness. While the wall structure thickness will vary from application to application, preferably the wall structure thickness should not be less than fifteen percent of the diameter of hollow cylinders 18. The generally uniform thickness of radially extending members 17 assists in maintaining uniform structural shock absorption characteristics throughout impact roller structure 10.

Note that the overall thickness of hub portion 11 is greater than that of radially extending members 17 so as to provide added protection for shaft 14. Ring-like portion 15 also has a generally greater thickness than radially extending members 17 to provide additional protection upon impact.

Radially extending members 17 are thusly constructed and arranged to absorb and to transmit the shock imparted on impact roller structure 10 to adjacent radially extending members 17, hub portion 11, and ring-like portion 15. Thus, the shock forces are distributed throughout impact roller structure 10.

As illustrated in FIG. VIII, radially directed shock force, due to impact at ring-like portion 15, is directed and spread throughout impact roller structure 10. This is accomplished, as mentioned previously, by deformation of radially extending members 17. Portions 61a, 61b of radially extending members 17 upon impact of an external load will spread horizontally apart and downward. This is accomplished by members 61a, 61b moving into the space defined by hollow cylinder 18 and opening 63, thereby distorting their shapes. The movement of members 61a, 61b absorbs some of the shock and transmits the balance of the shock to middle portion 64 and an outer portion 61 of an adjacent radially extending member 17. Middle portion 64 then directs or channels the force to inner base portion 60. Portions 60a, 60b of inner base portion 60 are deformed and move into the space defined by hollow cylinder 18 and opening 62, thereby distorting their shape. The movement of members 60a, 60b absorbs some of the shock and once again transmits the balance of the shock to an adjacent base portion 60 or hub portion 11. The transmittal and absorption of the shock forces continues in a similar chain-like fashion about the structure of impact roller 10.

The ability of radially extending members 17 in cooperation with hub portion 11 and ring-like portion 15 to absorb and distribute the forces due to impact avoids excessive load or deformity at any one location about impact roller structure 10. In addition to preventing possible breakage of impact roller structure 10, shear forces or abrasive forces exerted on conveyor belt 13 are also minimized due to the uniform deformation of impact roller structure 10 and its ability to return to its original shape.

Cylinders 18 may include on the interior thereof a shock absorbing material 25 as shown in FIG. X or air-tight liners 26 as shown in FIG. XI which may be pressurized to provide additional shock absorption characteristics. The diameter of cylindrical openings 18 preferably should not exceed one third of the diameter of impact roller structure 10. If cylindrical openings 17 are too large, there will not be sufficient structural support.

As shown in FIG. VI, impact roller structures 10 are supported relative to the conveyor belt assembly by hexagonal shaft 14 which extends transversely of conveyor belt 13 and which is suitably journaled at the ends thereof in bearing structure 30 mounted on framework 29 of the conveyor belt assembly. It should be understood that the present invention can be utilized on a cylindrical shaft or shafts having various other configurations.

Shown in FIG. II are the various elements of bearing structure 30 and a milled end portion of shaft 14 which serves as a journal member 31 rotatable within bearing structure 30. Bearing structure 30 includes a molded bearing block portion or pillow block member 32 which is suitably supported on a mounting yoke 33 fixedly secured on framework 19 of the conveyor belt assembly. Mounting yoke member 33 which may be made of steel or any appropriate material, has two vertically upright members 34 for releasable insertion respectively into two vertically upright grooves 35 on the sides of pillow block member 32. Vertical members 34 cooperate with upright grooves 35 to retain pillow block member 32 in position on the conveyor belt assembly. However, because of the tongue and groove nature of the mounting, pillow block 32 is easily removed from mounting yoke 33 for repairs. It should be noted that the above-described bearing block structure can be replaced with a ball or roller bearing structure where desired.

Pillow block members 32 include a hollow tubular liner or cylinder 37 constructed and arranged to receive a bushing 38. Bushing 38 has a raised axially extending rib or key 39 adapted for reception in an axially extending groove 40 of tubular liner 37. Note that axially extending rib or key 39 and groove 40 enable relatively easy insertion of bushing 38 into and out of tubular liner 37 thereby enabling bushings 38 to be readily slipped out and changed if necessary.

Bearing 30 may include a sleeve 41 constructed and arranged for insertion in bushings 38 so as to provide a bearing surface for journaled portion 31 of shaft 14 on which impact roller structure 10 is mounted. Sleeve 41 provides for bearing 30 having a longer useful life since journaled portion 31 of shaft 14 makes contact with sleeve 41 which can thus be made of a less abrasive material than bushing 38. Sleeve 41 can also be easily replaced if subjected to excessive wear.

At certain locations along the conveyor belt assembly it is usually not necessary nor even desirable to have impact roller structure 10 mounted adjacent one another on hexagonal shaft 14 since there is no appreciable impact force being applied to conveyor belt 13 at that location. An example of this would be along the return portion of conveyor belt 13 where no appreciable load is applied. As illustrated in FIG. V, spacer 45 may be mounted between adjacent impact roller structures 10 on shaft 14 to provide various spacings between adjacent impact roller structures 10. Spacer 45, as illustrated in FIGS. 1 and XII, has an outer cylindrical shell 46 having a radial dimension approximating that of cylindrical seal 49. Spacer 45 has an aperture 47 extending axially therethrough having six sides in a hexagonal arrangement constructed for reception of hexagonal shaft 14. Spacer 45 further has members 48 extending axially from both ends thereof which are constructed to cooperate with members 21 axially extending from hub portion 11 thereby preventing slippage between impact roller structure 10 and spacers 45. Note that spacers 45 may have any desired axial dimension so as to provide the desired axial spacing between adjacent impact roller structure 10.

In addition, shown in FIGS. I and VII are hollow cylindrical seals 49 which may be mounted on shaft 14 between impact roller structure 10 and bearing structure 30 to prevent dirt and gravel from working its way into bearing structure 30. Cylindrical seals 49 have an inner liner or thrust washer 50 constructed from any suitable material but preferably a polyester to provide additional sealing capability. Thrust washer 50 has an aperture 51 extending axially therethrough and having six sides in a hexagonal arrangement constructed for reception of hexagonal shaft 14. Thrust washer 50 has a generally smooth surface at one end thereof and axially extending members 52 at the other end thereof constructed and arranged for cooperating with axially extending members 21 of impact roller structure 10. Cylindrical seal 49 further has an outer liner 53 constructed from any suitable material but preferably a polyurethane composite which provides a revolving surface or seal for throwing out any particulate that might come into contact with cylindrical seal 49, whereby extensive wear of impact roller structure 10 and bearing structure 30 due to particulate accumulation is prevented.

As illustrated in FIG. II, bushing 38 may contain a radially extending flange or ring-like portion 55 axially facing impact roller structure 10. Ring-like portion 55 engages the smooth surface end of thrust washer 50 of cylindrical seal 49. Outer liner 53 is shown in FIG. VI as overlapping ring-like portion 55 of bushing 32 to effectively seal off bearing structure 30.

In use, various combinations of impact roller structure 10, spacer 45 and cylindrical seal are mounted on shaft 14 to provide the configuration and width desired for an impact idler assembly unit.

From the foregoing, it will be seen that the present invention provides an impact roller 10 displaying high shock absorption characteristics and which is relatively inexpensive to manufacture. In addition, the present invention provides flexibility so as to be adaptable in many different configurations and combinations of impact idler units. Also, the present invention with its unique bearing structure 30 and revolving seal 49 offers an extended life with lower maintenance costs. The relatively few working parts and modularity of the present invention enables ease of access, thereby enabling repairs in less time than presently possible.

It is to be understood, however, that even though these numerous characteristics and advantages of the invention have been set forth in the foregoing description, together with details of the structure and function of the invention, the disclosure is illustrative only and changes may be made in detail, especially in matters of shape, size and arrangement of parts within the principle of the invention, to the full extent indicated by the broad general meaning of the terms in which the appended claims are expressed.

What is claimed is:

1. An impact roller, comprising:
   (a) hub means having an opening therein;
   (b) outer ring-like means interconnected with said hub means; and
   (c) means for absorbing shock due to impact on said impact roller, said means including a plurality of radially extending members positioned between said hub means and said ring-like means, said means being constructed and arranged to absorb shock imparted on said impact roller, said members comprising double concave walls, each of said walls including a fork-like structure at its radially inner end and at its radially outer end, said roller being constructed of polyurethane having a durometer in the range of 80A to 70D.

2. An impact roller, comprising:
   center hub means for mounting said roller on a shaft;
   an outer ring-like means for making contact with an endless conveyor belt, said ring-like means serving to support said belt;
   a plurality of axially extending cylindrical portions spaced around said hub means, said cylindrical portions being integral with said hub means and said ring-like means to support said ring-like means with respect to said hub means, adjacent of said cylindrical portions having a common wall therebetween which extends radially inwardly to separate into a fork-like structure which deforms slightly upon impact of an external load on said roller thereby uniformly spreading the shock of said impact.

3. The impact roller of claim 2 wherein said common wall of said cylindrical portions further extends radially outwardly and separates into a fork-like structure which also deforms slightly upon impact of an external load.

4. An impact roller in accordance with claim 2, wherein said cylindrical portions include on the inside thereof a shock absorbing material, said material providing additional shock absorbing characteristics.

5. An impact roller in accordance with claim 2, wherein said cylindrical portions include on the inside thereof an airtight liner, said liner being pressurized on the inside thereof to provide additional impact absorbing characteristics.

6. An impact roller in accordance with claim 3, wherein said radially extending members have a double concave shape such that two adjacent radially extending members define one hollow cylinder, said radially extending members further defining an opening at an inner base portion thereof and an opening at an outer portion thereof.

7. An impact roller in accordance with claim 2, wherein said hub portion has a plurality of axially extending members, said axially extending members extending from both ends of said hub portion.

8. An impact roller in accordance with claim 2, wherein said hub portion has a plurality of axially extending members, said axially extending members extending from both ends of said hub portion, whereby said impact roller may be interconnected to an adjacent roller, said axially extending members cooperating with said adjacent roller so as to prevent the relative movement of said rollers with respect to each other, thereby allowing various combinations of rollers to be arranged for supporting the conveying surface.

9. An impact roller in accordance with claim 7, further comprising a cylindrical seal having axially extending members from one side thereof, said axially extending members being constructed and arranged to interconnect with said axially extending members of said hub portion, said cylindrical seal cooperating with said impact roller to form a revolving seal to throw out any particulate that might come in contact with said seal, whereby extensive wear of said roller is minimized.

10. A unitary one piece impact roller, for absorbing impact imparted on a conveyor belt, said roller comprising:
    a center hub;
    an outer ring-like portion for making contact with a conveyor belt;
    a plurality of axially extending cylindrical portions defined by a plurality of double concave walls, adjacent of said cylindrical portions having a common double concave wall therebetween which separates radially outwardly to form a fork shaped structure which supports the outer ring-like portion, said fork shaped portion being adapted for slight deformation upon impact of an external load on said ring-like portion, said common wall further separating radially inwardly to form a fork shaped structure prior to interconnecting with said hub, said fork shaped structure being adapted to permit slight deformation upon impact of an external load on said outer ring-like portion thereby uniformly spreading said impact load throughout said roller.

11. A unitary one piece impact roller in accordance with claim 10, wherein said cylindrical portions further include on the inside thereof pressurized air filled tubes for absorbing shock imparted on said roller.

12. A unitary one piece impact roller in accordance with claim 10, wherein said cylindrical portions further include on the inside thereof a shock absorbing material for absorbing shock imparted on said roller.

13. A unitary one piece impact roller in accordance with claim 10, wherein said roller is constructed of elastomeric resilient material for enhanced absorbtion of impact.

14. An impact roller and bearing structure for use in a conveyor assembly, comprising:
(a) an impact roller rotatable about an axis, said roller having an inner hub portion and an outer ring-like portion, said ring-like portion being interconnected to said hub portion, a plurality of members extending in a radial direction from said hub portion to said ring-like portion, said members extending substantially the axial extent of the roller in a generally axial direction, said members each including an inner forked structure and an outer forked structure to deform and absorb shock;
(b) an elongated hexagonal shaft extending through a hexagonal opening in said hub portion of said roller, said shaft being axially rotatable with said roller, said shaft being further milled at each end thereof so as to form a cylindrical shaft portion at the ends thereof; and
(c) a bearing structure constructed and arranged for mounting on a frame of a conveyor, said bearing structure having an opening therein for reception of said milled end of said hexagonal shaft, whereby said bearing structure supports said impact roller and its associated hexagonal shaft.

15. An impact roller and bearing structure in accordance with claim 14 wherein said hub portion of said roller has a plurality of axially extending members.

16. An impact roller and bearing structure in accordance with claim 15 wherein said axially extending members are suitably connected to a cylindrical seal, said cylindrical seal being mounted on said shaft between said roller and said bearing structure and cooperating with said axially extending members to form a revolving seal to throw off any particulate that might come in contact with said seal, whereby extensive wear of said roller and bearing structure due to particulate is minimized.

17. An impact roller and bearing structure in accordance with claim 16, wherein said cylindrical seal is a hollow open-ended cylindrical seal mounted on said shaft between said roller and said bearing structure, said seal having on one side thereof axially extending members for cooperating with said axially extending members of said hub portion and having on the other side thereof a relatively smooth surface.

18. An impact roller and bearing structure in accordance with claim 17 wherein said bearing structure comprises a ring-like portion axially facing said impact roller, said ring-like portion making contact with said side of said cylindrical seal having a smooth surface, said ring-like portion cooperating with said cylindrical seal to prevent particulate from penetrating into said bearing structure.

19. An impact roller and bearing structure in accordance with claim 14, wherein said bearing support structure further includes a cylindrical hollow bearing sleeve constructed and arranged for insertion in said opening of said bearing support structure.

20. An impact roller and bearing structure in accordance with claim 19, wherein said hexagonal shaft is adapted for reception in said cylindrical hollow bearing sleeve retained in said opening of said bearing support structure.

21. An impact roller and bearing structure in accordance with claim 14 wherein said bearing support structure includes a molded support portion suitably supported at a frame of the conveyor for supporting the hexagonal shaft.

22. An impact roller and bearing structure in accordance with claim 14, further comprising a second impact roller, said impact roller being interconnected by said axially extending members, said axially extending members cooperating with each other so as to prevent the relative movement of said rollers with respect to each other.

23. An impact roller and bearing structure in accordance with claim 22 further comprising a hollow cylindrical spacer mounted on said shaft between said adjacent rollers, said spacer including axially extending members for cooperating with said axially extending members of said rollers to prevent the relative movement of adjacent rollers with respect to each other.

* * * * *